United States Patent [19]
Kistner et al.

[11] Patent Number: 6,120,684
[45] Date of Patent: Sep. 19, 2000

[54] STORMWATER TREATMENT SYSTEM

[75] Inventors: Michael J. Kistner, East Amherst; Paul J. Rowe, Fairport; John G. Stark, Cheektowaga, all of N.Y.

[73] Assignee: Tec-Kon Enterprises, LLC, Lockport, N.Y.

[21] Appl. No.: 09/225,622

[22] Filed: Jan. 5, 1999

Related U.S. Application Data

[60] Provisional application No. 60/070,554, Jan. 6, 1998.

[51] Int. Cl.[7] ........................................................ E03F 5/14
[52] U.S. Cl. ........................ 210/163; 210/512.1; 210/521; 210/532.1
[58] Field of Search ..................................... 210/801, 802, 210/163, 164, 519, 521, 532.1, 304, 512.1; 404/2, 4

[56] References Cited

U.S. PATENT DOCUMENTS

| | | | |
|---|---|---|---|
| 1,902,171 | 3/1933 | Kopp | 210/301 |
| 2,179,919 | 11/1939 | Carr et al. . | |
| 2,308,670 | 1/1943 | Bolton . | |
| 3,626,823 | 12/1971 | Toth . | |
| 4,107,038 | 8/1978 | Weis . | |
| 4,460,462 | 7/1984 | Arneson . | |
| 4,483,774 | 11/1984 | Brill et al. . | |
| 5,667,689 | 9/1997 | Graves . | |
| 5,688,400 | 11/1997 | Baxter, Sr. . | |
| 5,759,415 | 6/1998 | Adams | 210/776 |
| 6,014,987 | 1/2000 | List et al. . | |

OTHER PUBLICATIONS

Vortechnics, "Variable Rate Variable Level Grease–and–Grit Trap" Company brochure (date unknown).
Kistner Concrete Products, V2 Separator blueprint, May 2, 1997 Environment XXI, NY.
Environmentm XXI, $V^2$ Bl Structural Stormwater Treatment System, Company brochure (date unknown).

*Primary Examiner*—David A. Simmons
*Assistant Examiner*—Fred Prince
*Attorney, Agent, or Firm*—Hayes, Soloway, Hennessey, Grossman & Hage PC

[57] ABSTRACT

An apparatus for separating floating and non-floating particulates from drain water wherein the apparatus includes a first chamber for collecting non-floating particulates, a second chamber for collecting floating particulates, and a third chamber through which treated drain water can be discharged from the apparatus. An inlet pipe for introducing drain water into the first chamber is provided tangential to the first chamber to provide a vortex flow of drain water into the first chamber, and an outlet pipe providing flow of drain water from the first chamber to the second chamber has an inlet at the vortex of drain water flow in the first chamber.

6 Claims, 5 Drawing Sheets

| approx. total flow rate (cfs) | P1 (In +/−) | P1 % of total flow rate | P2 (In +/−) | P2 % of total flow rate | P3 (In +/−) | P3 % of total flow rate | D1 (feet) | D2 (feet) | H (min) (feet) |
|---|---|---|---|---|---|---|---|---|---|
| 2.8 | 10 | 90% | 8 | 67% | 4 | 25% | 4 | 4 | 4 |
| 4.3 | 15 | 90% | 12 | 67% | 6 | 25% | 5 | 4 | 7 |
| 6.2 | 20 | 90% | 18 | 67% | 8 | 25% | 6 | 5 | 8 |
| 11.1 | 24 | 90% | 20 | 67% | 10 | 25% | 8 | 6 | 10 |
| 17.4 | 30 | 90% | 24 | 67% | 12 | 25% | 10 | 8 | 10 |
| 25.1 | 36 | 90% | 30 | 67% | 15 | 25% | 12 | 10 | 10 |

FIG. 7

STORMWATER TREATMENT SYSTEM

This application claims the benefit of provisional application Ser. No. 60/070,554 filed Jan. 6, 1998.

The present invention relates generally to the treatment of stormwater and similar surface runoff. More particularly, the present invention relates to the removal of floatable and non-floatable matter therefrom so that cleaner water is returned to the environment.

Eighty percent of the pollution to the North American fresh water resource has been attributed to stormwater runoff. Sediments, contaminated by hydrocarbons and their floating residuals, flow freely from paved impervious sites into storm water collection systems. Mitigated wet lands and storm water ponds are historically accepted as the method of controlling storm water quality. While ponds and wetlands are, on one hand, an effective treatment for non-point source discharges, they nevertheless undesirably occupy valuable commercial property and create an open water liability.

Oil and grit separators have been used to control hydrocarbon loadings. Such a separator comprises a concrete structure linked to the storm drain system with two pools used to trap oil and grit. Such a separator is illustrated in "Hydrocarbon Hotspots in the Urban Landscape: Can they be Controlled?" Watershed Protection Techniques, Vol. 1, No. 1, February, 1994. This article states that recent research indicates that such oil and grit separators are not effective in trapping pollutants.

Vortechnics of Portland, Me. has offered a storm water treatment system which has a tangential inlet to a circular grit chamber wherein a swirling motion is produced to direct settleable solids toward the center and to reduce resuspension in the grit chamber.(See U.S. Pat. No. 5,759,415 Jun. 2, 1998). The water is released from the grit chamber into an oil chamber defined between the grit chamber and a barrier wall, which has an outlet which is located at the bottom thereof to thereby provide a baffle which traps floatables in the oil chamber. The barrier wall also has an upper overflow outlet. These outlets direct the water into a flow control chamber which has a lower outlet higher than the lower outlet from the oil chamber and has upper overflow outlet. These flow control chamber outlets, which are provided with weirs for flow control, direct the water into an outlet chamber from which the treated water is removed through a lower outlet pipe.

The grit chamber outlet for the Vortechnics system is in the wall thereof. Thus, water swirling along the side of the circular grit chamber wall is passed through this outlet. Suspended particulate matter may not have been adequately removed from this water by the time it passes into the outlet which is also inefficently large in size. It is therefore considered desirable to more efficiently remove particulate matter from the water before it is passed into the oil chamber.

It is accordingly an object of the present invention to provide a more efficient storm water treatment system.

It is also an object of the present invention to provide such a system which is inexpensive, easy to operate (passive), and reliable.

In order to provide such a system, in accordance with the present invention, runoff water is passed tangentially into a primary chamber wherein non-flotable matter is removed by swirling action of the water, then through an outlet for passage into a secondary chamber for removal of oil and other floatable matter therefrom, the outlet being located centrally of the primary chamber to remove water from which greater amounts of non-flotable matter has been removed.

The outlet from the primary chamber is preferably provided by a conduit which extends into the primary chamber with its end portion, which provides the outlet, disposed vertically.

The above and other objects, feature, and advantages of the present invention will be apparent in the following detailed description of the preferred embodiment thereof when read in conjunction with the appended drawings wherein the same reference numerals denote the same or similar parts throughout the several views.

DETAILED DESCRIPTION OF THE PREFERRED EMBODIMENT

Referring to the drawings, there is illustrated generally at 10 a packaged apparatus for treating water, illustrated at 12, such as stormwater or other surface runoff such as, for example, from industrial, commercial, and urban applications. The water 12 is treated by removing non-floatable matter such as sand, hydrocarbon-laden sediment, debris, silt, and heavy metals, illustrated at 14, and floatable matter such as oil and other petroleum-based liquids, illustrated at 16, therefrom. The contaminated water is received through inlet pipe 18, as illustrated at 19, and the treated water is discharged through outlet pipe 20 for return to the environment, as illustrated at 21, or as otherwise desired.

The apparatus 10 comprises a primary chamber, illustrated at 22, for removing sediment and other non-floatables 14 from the water, a secondary chamber, illustrated at 24, for removing oil and other floatables 16 from the water, and a tertiary effluent chamber, illustrated at 26. The water 12 initially enters the primary chamber 22 by flowing through inlet pipe or conduit 18 and is discharged from the tertiary chamber 26 although outlet conduit 20. The inlet conduit 18 would typically be an existing conduit sized (having a diameter) for the flow rate to be handled, and the apparatus 10 would typically be constructed at the site for connection of the conduit 18 thereto.

The primary chamber 22 is contained within a housing 28 which has a circular wall 30, a floor 32, and a ceiling 34 suitably joined together and composed of suitable material such as, for example, high strength steel-reinforced corrosion-resistant precast concrete suitable for heavy truck traffic loading. The floor 32 is desirably a monolithic base section for desirably providing anti-floation of the housing 28. The housing 28 may, for example, be on the order of about 6 to 10 feet high and about 6 to 10 feet in inside diameter depending on the flow rate, on the order of about 3 to 26 or higher cubic feet per minute, the apparatus is to be capable of handling, as more specifically indicated, by example, in FIG. 7. The pipe 18 is suitably sealingly secured in an opening in the wall 30 of housing 28. Conduit 18 as well as other conduits described in this specification, which may be composed of steel, plastic, or other suitable material, may be suitably sealingly secured in openings in their respective walls by means of grout, illustrated at 19, or other suitable means. The secondary and tertiary chambers 24 and 26 respectively are contained within a similarly shaped and sized housing 36, which is more specifically indicated, by example, in FIG. 7, and which is shown to have a circular wall 31, a floor 33, and a ceiling 35. Housing 36 may be otherwise suitably shaped, such as, for example, rectangular in a horizontal plane. Outlet pipe 20 is suitably sealingly secured within an opening in the wall 31 of housing 36. Inlet 18 and outlet 20 are located at about the same height intermediate the heights of the housings 28 and 36 respectively, for example, at or slightly below mid-height. Outlet pipe 20 exits radially of housing 36, i.e., in a direction along a direction in which a diameter of the housing extends. The outlet pipe 20 is sized (has a diameter) to handle the flow rate and thus would typically have a diameter equal approximately to the diameter of inlet pipe 18.

When, during a storm event, the water flow through pipe 18 is near the capacity of pipe 18 (flow rate for which pipe 18 is sized), the water is flowed into the chamber 22 at high velocity to achieve a long path length for the solids during travel through the first chamber which allows the non-floatable solids 14 to desirably be deposited out or dropped to the bottom of the chamber 22 and thereby become separated from the water. The storm event creates the energy to achieve the desired velocity.

If desired, a suitable check valve may be installed on pipe 18 to prevent back-flow as well as to provide a nozzle effect by opening only under a head pressure thereby providing the desired velocity when there is flow into the chamber 22. A suitable check valve for this purpose is a TIDEFLEX valve marketed by Red Valve Company, Inc. of Pittsburgh, Pa. Such a valve may be especially desirable in tidal areas to prevent back-flow.

Figure 1:
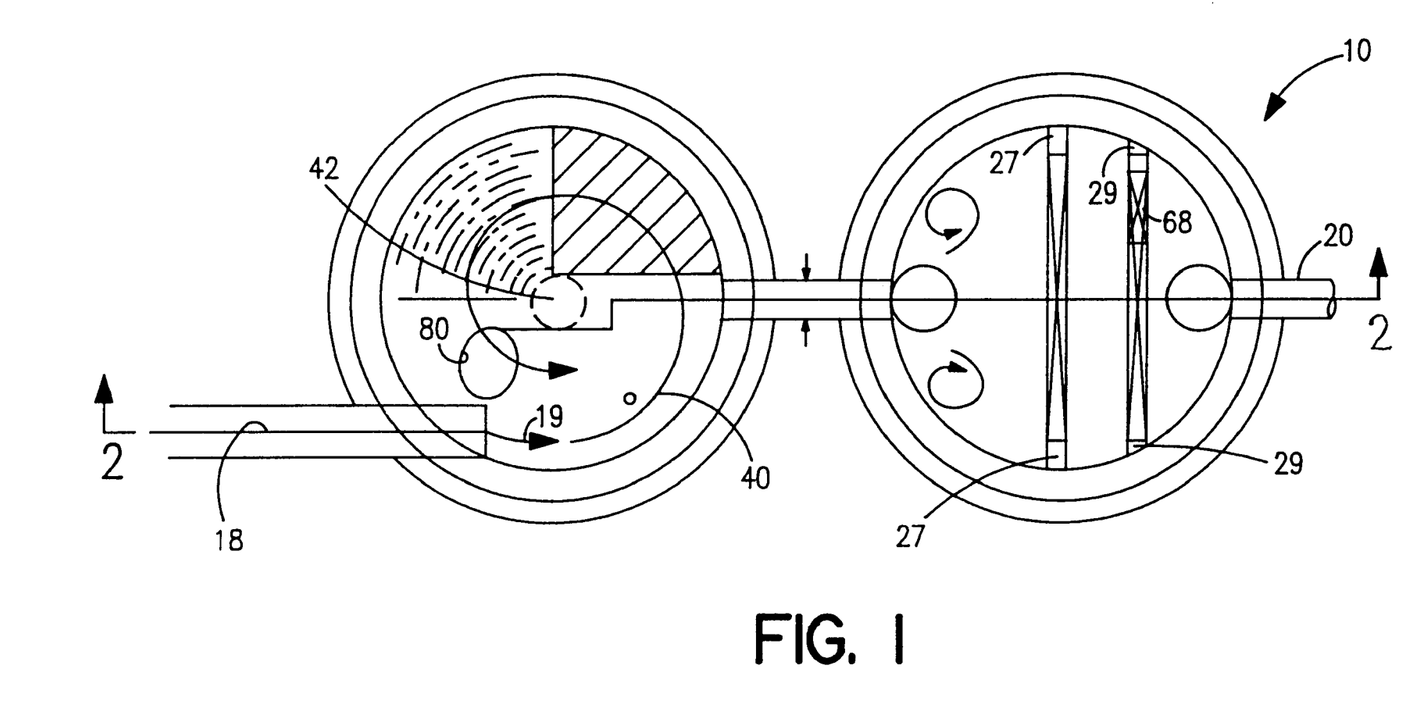
FIG. 1 is a partly schematic plan view, with portions broken away to show internal structure, of a storm water treatment apparatus which embodies the present invention.
Figure 2:
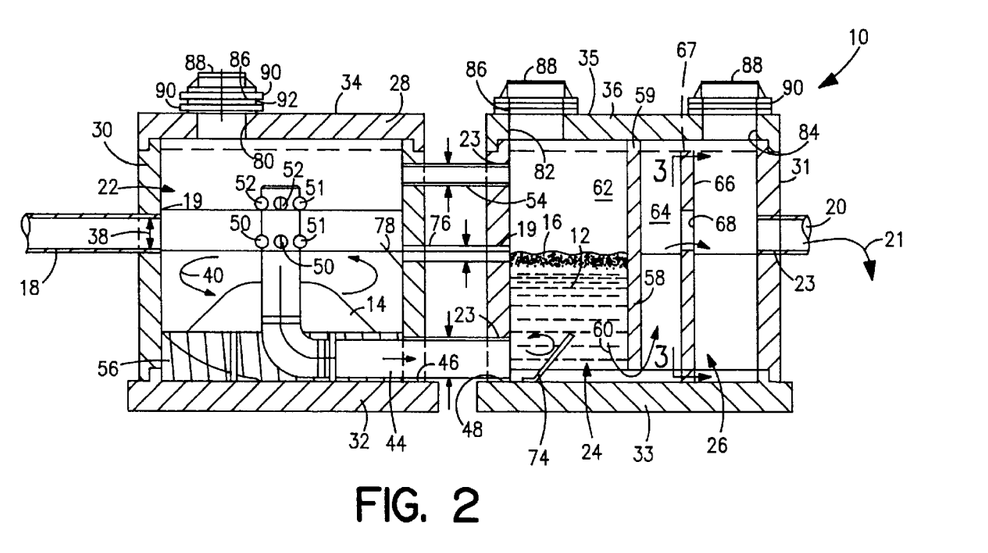
FIG. 2 is a partly schmatic sectional view thereof taken along lines 2—2 of FIG. 1.
Figure 3:
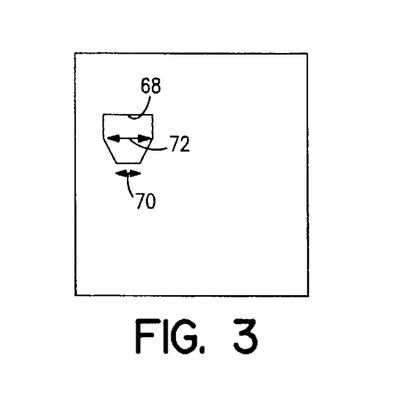
FIG. 3 is a sectional view taken along lines 3—3 of FIG. 2.

The pipe 18 is disposed, as illustrated in FIG. 1, to be tangential to the primary chamber 22, i.e., it extends in a direction, in a horizontal plane, generally of a direction in which a tangent to the chamber 22 in the horizontal plane extends The high velocity water is thus introduced into the primary chamber 22 tangentially in order to effect a circular or swirling motion, illustrated at 40, to the water about the center, illustrated at 42, to form a void or vacuum or vortex about the center 42 and thereby drawing toward and into the vortex bodies subject to its action, i.e., drawing suspended particles 14 in the water into the vortex and dropping them onto the bottom of the chamber 22, as illustrated in FIG. 2. This vortex action is provided to also keep the particles 14 on the chamber bottom so that they don't become reentrained or resuspended in the water.

The water with the non-floatable matter 14 removed is then removed from the primary chamber 22 for passage into the secondary chamber 24 through an outlet. If the outlet were located in the circular chamber wall 30, as in the aforesaid Vortechnics apparatus, the water may not be as devoid of non-floatable matter as water nearer the vortex. In order to remove water near the vortex where it is more devoid of non-floatable matter so that a higher quality of partially treated water is delivered to the secondary chamber 24 for more efficient water treatment, in accordance with the present invention, one end portion of a pipe or other suitable conduit 44 is received and suitably sealingly secured in adjacent openings 46 and 48 in the walls of primary and secondary chambers 22 and 24 respectively near the bottoms thereof for delivery of the water to the secondary chamber 24, and the other end portion of the pipe 44 is capped or otherwise closed and is positioned to extend vertically at the center 42 of the primary chamber 22 and terminates slightly above the height of pipe 18 at the inlet 38 to provide openings, illustrated at 50 and 52, to serve as an inlet for the water at the center 42. These openings 50 and 52 positioned at the center of the chamber 22 so that they are at the center of the vortex may be collectively called a coriolus intake, i.e., the rotating motion of the water and the resulting low pressure at the vortex causes entrained particles to fall downwardly into a stable pile so that the water, but not the diverted particles, enters the intake at that location. Thus, the pipe 44 extends horizontally from the secondary chamber 24 into the center of the primary chamber 22 then bends 90 degrees to extend vertically to its terminal end. A model plate 56, which comprises a structure forming sectioned voids, or alternatively concrete fill is received on the floor 34 to encase and thereby secure the horizontal section of the pipe 44 at the bottom of the chamber 22.

The plate 56 also provides a shelf on which the non-floatable material 14 is received.

The coriolus intake comprises, for lower flow rates such as during lighter storms, a first plurality of small openings 50 which are circumferentially spaced about the pipe 44 at a height approximately level with the height of the pipe 18. A second plurality of small openings 52, which are also spaced circumferentially about the pipe 44, are provided above the openings 50 by a small distance of, for example, about 6 inches in order to handle, in conjunction with openings 50, an increased flow rate. This also allows the openings 50 and 52 to be sized desirably small for increased efficiency of sediment removal, i.e., the sediment does not as easily enter the openings 50 and 52 when they are smaller. For example, each plurality of openings 50 and 52 may comprise about 6 openings equally spaced circumferentially and each having a diameter of about 1 inch. A suitable baffle, illustrated at 51, is suitably provided over each of the openings 50 and 52 to deflect particles, which have not already fallen, away from the openings 50 and 52 so that good efficiency of the apparatus 10 can be maintained. Thus, the coriolis intake is provided to allow the stormwater above the separated solids to pass virtually sediment-free to the next treatment phase in secondary chamber 24.

An overflow pipe or other suitable conduit 54 extends between the primary and secondary chambers 22 and 24 respectively near the ceilings thereof, and is suitably sealingly attached in openings in the walls thereof, for dumping some of the treated (due to the swirling action 40) water into the secondary chamber 24 if the flow rate into the primary chamber 22 exceeds its capacity to handle it. As discussed more fully hereinafter with respect to the alternative embodiment of FIGS. 4 to 6, it may be preferred to extend the conduit 54 so that it discharges into section 64 of secondary chamber 24 or into effluent chamber 26.

Oil and other floatable material 16 is separated from the water in the secondary chamber 24, i.e., means are provided for preventing the floatable material from entering the tertiary effluent chamber 26. The secondary chamber 24 is provided to be relatively quiescent, suitable for allowing oil and other floatable matter to float to the top without disruptedly mixing back into the water whereby such separation may efficiently occur. In order to prevent oil from entering the tertiary chamber 26, a barrier wall 58 extends downwardly from just below the ceiling 33 and terminates at a distance of, for example, 12 to 18 inches above the floor 35 to provide a flow path, illustrated at 60, underneath the wall 58 from one section, illustrated at 62, to another section, illustrated at 64, of the secondary chamber 24. Watertight grouting or bricking or caulking or other suitable means, illustrated at 59, is provided to watertightly seal the space between the wall 58 and ceiling 33. Structural portions 27 on the sides of the wall 58 extend between and are suitably attached to the floor 33 and ceiling 35 to support the wall 58. Since water entering section 64 must as a result come from the bottom of the body of water in section 62 and since oil and other floatables rise to and float on top of the water, the flow path 60 is accordingly provided so that they do not enter the section 64.

In order to prevent oil-laden water exiting pipe 44 from passing directly into pathway 60 so that good separation efficiency of the apparatus 10 is maintained, a suitable baffle or plate deflector 74 is disposed adjacent the outlet of the pipe 44 to re-direct the water away from pathway 60 so that the floatables 16 have time to rise after the water passes out of the pipe 44. The baffle 74 is shown to be suitably attached to the floor 35 and slope upwardly and away from the pipe 44 at an angle of about 45 degrees over the height of the pipe 44.

A barrier wall 66, which extends from floor 35 to just below the ceiling 33 (leaving a space, illustrated at 67, which may be, for example, between 1 and 4 inches between its upper edge and the ceiling), separates section 64 from the tertiary chamber 26. Structural portions 29 extend from and are attached to the floor 33 and ceiling 35 to support the wall 66. Wall 66 has an opening, illustrated at 68, at approximately the level of the intake 18 so as to maintain the level of water in the secondary chamber 24 at this level whereby to keep the floatable matter 16 away from flow path 60. The opening 68 is off-set to one side of the wall 66 so that it is not directly lined up with outlet 20. This opening 68 provides passage of the water 12, with non floatables 14 removed in the primary chamber 22 and with floatables 16 removed in the secondary chamber 24, into the tertiary effluent chamber 26 for its removal through pipe 20 to the environment in an environmentally-desirable cleansed state. The opening 68 is preferably in the shape of a weir, i.e., for providing regulated laminar flow into the tertiary chamber 26. Thus, opening 68 has a reduced width, illustrated at 70, at the bottom thereof for reduced water flow therethrough during low water intake periods and an increased width, illustrated at 72, in the upper half thereof to provide increased water flow therethrough when it is necessary to handle higher rates of water flow through the apparatus 10, the width gradually increasing from width 70 to width 72 for laminar flow regulation, i.e., to steady or even out or calm the flow whereby to allow oil to float to the top so that there is a lesser chance of its passage through passage 60. For example, the ratio of width 70 to width 72 may be about 1 to 4, and the area of the weir 68 may vary between about 0.75 and 4 square feet depending on size. Thus, the trapped floating contaminants 16 in secondary chamber 24 are raised with the water level therein, which is kept at that level or higher by the height of weir 68 (or by the height of pipe 20 if the apparatus is not provided with a wall 66, as discussed below) so that the floatable contaminants, created by the storm event and subsequent storm events, are not washed out through the pipe 20.

Instead of wall 58, alternatively a hood may be attached to wall 66 above the opening 68 to extend downwardly and terminate short of the floor 35 to provide the flow path 60 and thus achieve the same result as achieved by wall 58.

It should be understood that, if desired, wall 66 need not be provided at all since the level of pipe 20 suitably determines the level in the secondary chamber 24. Thus, without wall 66, the treated water passing under wall 58 through path 60 will rise to the level of pipe 20 for discharge. An embodiment of the present invention without such a wall is discussed hereinafter with reference to FIGS. 4 to 6.

In order to divert oil and other floatable matter 16 into the secondary chamber 24 during relatively quiescent periods, a conduit 76 is provided to extend between chambers 22 and 24 (and is suitably sealingly attached to the walls 30 and 31) at approximately the level of the bottom of weir 68 at which the water level in secondary chamber 24 is normally maintained during quiescent periods. This allows passage through conduit 76 of only the surface of the water and the oil and other floatable matter thereon. A suitable baffle, illustrated at 78, may be provided at the entrance to conduit 76 in chamber 22 to prevent or reduce water laden with non-floatable matter from entering the conduit 76 during its circular motion during periods of relatively higher flow through the apparatus 10 when it is desirable that this water, with the sediment 14 released therefrom, pass instead through the pipe or conduit 44.

An opening, illustrated at 80, is contained in the ceiling 32 for venting as well as to allow access to primary chamber 22 for removing the sediment 14 therefrom and otherwise maintaining it. Similarly, a vent opening, illustrated at 82, is contained in the ceiling 33 and which allows access to section 62 of secondary chamber 24 for skimming the oil 16 from the surface of the water and removal thereof and otherwise for maintenance, and another vent opening, illustrated at 84, is contained in the ceiling 33 to allow access to tertiary chamber 26 for maintenance. Opening 80, which may have a diameter of, for example, about 24 inches, is suitably positioned so that it is not directly over the outlet provided by pipe 44. Openings 82 and 84 may be similarly sized. To each of these openings is suitably installed, in accordance with principles commonly known to those of ordinary skill in the art to which this invention pertains, a hatch 86 with a suitable vented cover 88, each of cast iron, steel, plastic, or other material. In order to allow for elevation change, i.e., so that the vent outlets are desirably above grade, riser rings 90 are provided between the respective ceiling and the cover 88, and the riser rings are suitably sealed to each other and to the ceiling and the cover by butyl joint material, illustrated at 92, or other suitable means. The number of riser rings 90 (three shown for each hatch) will vary depending on elevation. The hatch for the primary chamber is illustrated with the riser rings apart for ease of illustration.

If desired, additional equipment may optionally be added to the apparatus 10 for improving the separation efficiency thereof. For example, the secondary chamber 24 may be provided with an ECOSEP oil-water separator, marketed by Environment XXI of East Pembroke, N.Y., or other suitable high efficiency separator (with internal storage containment) for additional treatment (during non-storm events) to purify down to perhaps about 5 parts per million of non-emulsified free oil. For another example, a suitable coalescing filter structure, conventionally known in the art, may be attached to the outlet of the pipe 44 in the secondary chamber 24 to coalesce floatable particles into clumps thereof so that they more efficiently rise to the surface. Such a coalescing filter structure may also serve to deflect the water upwardly and away from passage 60 and therefore replace baffle 74.

Figure 4:
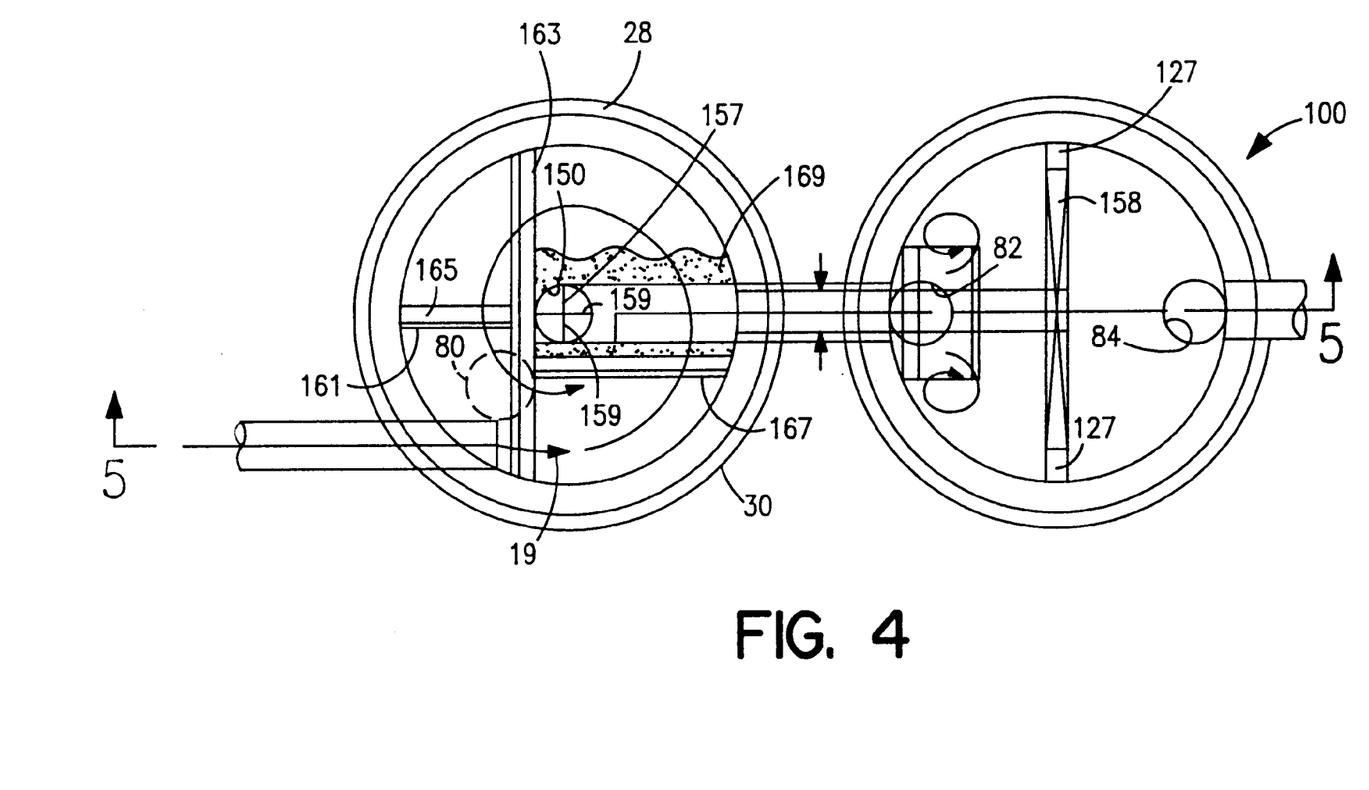
FIG. 4 is a view similar to that of FIG. 1 of an alternative embodiement of apparatus which embodies the present invention.
Figure 5:
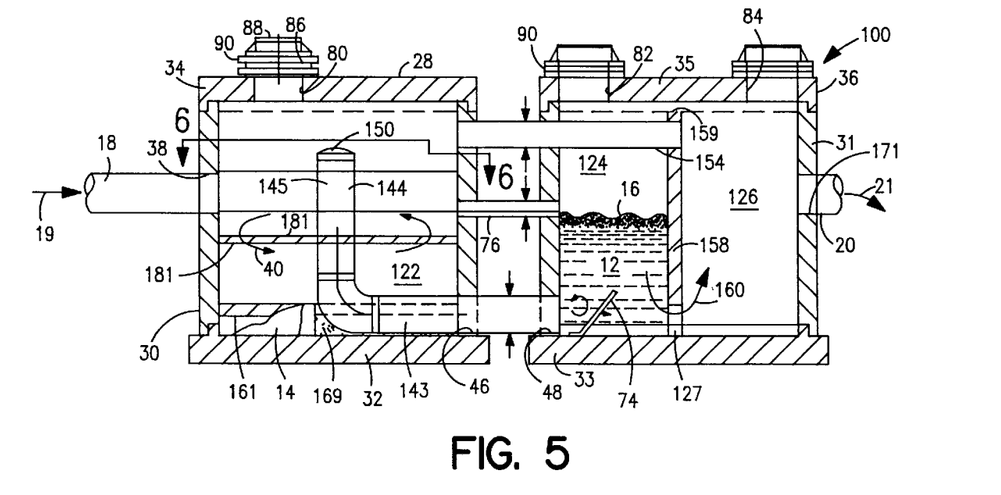
FIG. 5 is a sectional view, similar to that of FIG. 2, thereof taken along lines 5—5 of FIG. 4.

Referring to FIGS. 4 and 5, there is shown generally at 100 stormwater treatment apparatus in accordance with an alternative embodiment of the present invention. Similar to apparatus 10, the apparatus 100 includes housings 28 and 36 with a stormwater inlet conduit 18 connected to the housing 28 and an effluent outlet conduit 20 connected to the housing 36. Housing 28 contains a primary chamber, illustrated at 122, which serves the same function as served by primary chamber 22. Housing 36 contains secondary and tertiary chambers, illustrated at 124 and 126 respectively, which are separated by vertical wall 158 and which together serve the same functions as served by secondary and tertiary chambers 24 and 26 respectively together, as discussed more fully hereinafter. Similar to apparatus 10, the apparatus 100 contains vent openings 80, 82, and 84 for the respective chambers 122, 124, and 126, each such opening provided with a hatch 86, cover 88, and, as needed, riser rings 90. Apparatus 100 is similar to apparatus 10 except as otherwise shown and/or described herein.

Similar to apparatus 10, the apparatus 100 has a conduit 144 one end portion 143 of which extends horizontally and is sealingly received in openings 46 and 48 for flowing the water, after its treatment in the primary chamber 122, into the secondary chamber 124, which includes a baffle 74 for directing the water flow upwardly in the secondary chamber 124 so that the water flow doesn't "short circuit" the secondary chamber 124 and thus inefficiently flow directly into the tertiary chamber 126. The conduit 144 has an opposite end portion 145 which, like conduit 44, extends vertically at the center 42 (in a horizontal plane of the chamber 122) of the circular primary chamber 122 and terminates slightly above the height of pipe 18 at the inlet 38 to provide an opening, illustrated at 150, to serve as an outlet at the center 42 of the primary chamber 122 for the water to be removed therefrom into the secondary chamber 124 via the length of the conduit 144.

Similar to apparatus 10, the inlet conduit 18 is disposed to be tangential to the circular primary chamber 122 so that the velocity of the water during a storm event effects a circular or swirling motion 40 to the water about the center 42 to form a void or vacuum or vortex about the center 42 and thereby drawing suspended particles 14 of the water into the vortex and dropping them onto the bottom of the chamber 122, this vortex action also being provided to keep the particles 14 on the bottom so that they don't become reentrained or resuspended in the water whereby to efficiently remove the non-floatable solids 14 from the water. The water with the solids 14 removed is then removed from the primary chamber 122 through outlet 150 for passage through conduit 144 into secondary chamber 124.

It is considered desirable to break up the vortex action in the water as it passes into outlet 150 in order to prevent or discourage a cyclonic water funnel from entering the coriolus intake and thereby undesirably drawing sediment through the conduit 144. In order to break up the vortex action, a member or anti-vortex device 157 having one or more walls 159 and composed of high density polyethylene, PVC (polyvinylchloride), a suitable corrosion resistant metal or alloy, or other suitable material is inserted into outlet 150 and suitably secured to the inner wall of conduit 144 such as, for example, by a suitable mechanical connection or extrusion weld. For example, member 157 may have two walls which extend diametrically across the outlet 150 and cross each other at a 90-degree angle and may have a height of about 6 inches and a thickness of about 0.25 inch. It should be understood that other suitable anti-vortex means may be provided at the primary chamber outlet. For example, the pluralities of small circumferentially spaced apertures 50 and 52 with the baffles 51 in the apparatus 10 of FIGS. 1 to 5 provides an alternative anti-vortex means.

A network 161 of sediment collection barrier walls is preferably provided across the chamber 122 at the level generally of the upper part of the horizontally extending conduit portion 143 and spaced from the floor 32 and suitably attached to circular wall 30 to decrease the velocity of the swirling stormwater at the bottom of the primary or contaminated sediment separation chamber 122 so as to aid the settling of the sediment 14. For example, FIG. 1 shows a first barrier wall 163 adjacent the conduit 144 and extending perpendicular to horizontal conduit portion 143 adjacent to the bend in conduit 143 and parallel to a diameter (in a horizontal plane) of the chamber 122, a second barrier wall 165 extending perpendicularly from the center of wall 163 and radially (in a horizontal plane) of the chamber in a direction away from conduit 144, and a third barrier wall 167 extending from the wall 163 alongside the conduit portion 143. It should be understood that other suitable velocity decreasing means may be provided at the bottom of chamber 122.

A block 169 of concrete or other suitable means is cast or otherwise provided about the sides of conduit portion 143 to preferably the height of the barrier wall network 161 (between the wall 167 and conduit portion 143 and up to the wall 163) for securely holding conduit 144 in place.

Similar to apparatus 10, a conduit 76 extends between primary and secondary chambers 122 and 124 respectively in order to divert oil and other floatable material 16 directly into the secondary chamber 124 during relatively quiescent periods. This conduit 76 is at about the level, illustrated at 171, of the bottom of the outlet or effluent conduit 20, which is the level at which the water is maintained in the secondary chamber 124 during such quiescent times, but (for apparatus 10 as well as apparatus 100) bottom of conduit 76 is slightly (for example, about 1 inch) above this level 171 to prevent backflow into primary chamber 122 so that floatable material 16, once in the secondary chamber 124, remains in the secondary chamber 124 until removed through opening 82 during normal maintenance or otherwise.

Unlike apparatus 10, the apparatus 100 has a single inner wall 158 in housing 36 which defines secondary and tertiary chambers 124 and 126 respectively. Wall 158 is supported by support portions 127, similar to support portions 27, along its sides which portions 127 extend from the floor 33 to the ceiling 35 and are suitably sealingly attached thereto as well as to the circular wall 31 such as by a suitable hydraulic cement or caulk. Similar to wall of apparatus 10, the wall 158 terminates short of the ceiling 35 leaving a void, illustrated at 159. The void 159 preferably extends across the entire horizontal inside diameter of circular wall 31 with a vertical dimension between about 1 and 4 inches. The liquid level in secondary chamber 124 should not rise high enough to flow over the top of the wall 158 because the most intense flows are bypassed through pipe 154 to thereby eliminate the chance for floatable "short circuiting." Similar to wall 58, wall 158 terminates above the floor 33 leaving a passage 160 for flow of water from secondary chamber 124 into tertiary chamber 126, the level of water in secondary chamber 124 being maintained by the level 171 of the bottom of outlet conduit 20 so that the floatable material 16 cannot pass into the tertiary chamber 126.

An overflow conduit 154 has one end portion sealingly secured in an opening of housing wall 30 near the ceiling 28 for relieving excess flow of stormwater from the primary chamber 122 by flowing some of the treated water 12 therefrom, sediment having been removed from the water during the swirling action 40. For example, the invert elevation or bottom of the inlet to conduit 154 may be about 2 inches above the horizontal "coriolus intake" opening 150. The overflow conduit 154 extends through and is sealingly secured in an opening in housing wall 31, extends through secondary chamber 124, and its other end portion extends through and is sealingly secured in an opening in wall 158 so as to discharge the treated overflow water into the effluent chamber 126. The overflow treated water is thus discharged into the effluent chamber 126 in order to not disrupt the quiescent nature of the secondary chamber 124 and thereby force some of the floatables 16 through passage 160 and into the effluent chamber 126 and thus in order to more efficiently allow a greater percentage of floatables 16 to remain captured through bypassing treated effluent directly to the outlet chamber 126.

Figure 6:
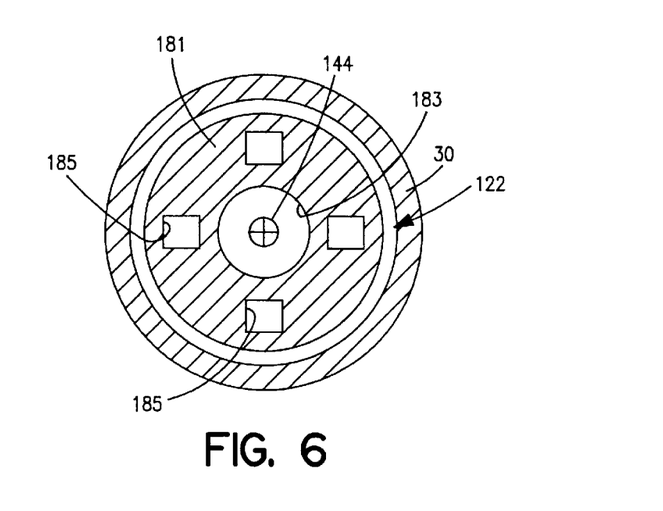
FIG. 6 is a sectional view thereof taken along lines 6—6 of FIG. 5.

A shelf 181 is shown installed below the inlet of conduit 18 (for example, about 6 to 12 inches below the inlet). Such a shelf is considered to be optional. Without wishing to be bound by theory here or elsewhere in this specification, it is believed that such a shelf 181 may be desirable to accelerate the settling of the solids 14 and provide some separation between the settled solids and the swirling water flow 40 whereby the space below the shelf 181 may be relatively less turbulent so that the solids may more efficiently be kept separated. Referring to FIG. 6, the shelf 181 is a circular plate which substantially fills (horizontally) the primary chamber 122 and is suitably supported at the desired height by attachment to wall 30 or otherwise. The shelf 181 is shown to have a central opening or aperture 183 which has a diameter which is substantially greater than that of the conduit 144 (for example, about twice the diameter of conduit 144) to provide an area underneath the vortex for the particles of sediment 14 to drop through. Openings or cut-outs, illustrated at 185, are shown spaced circumferentially about the periphery of the shelf 181 to allow a continuity of the swirling motion 40 below and above the shelf 181. For example, the shelf 181, which may have a thickness of about ¾ inch and may be composed of a similar material as anti-vortex device 157 is composed, may have 4 such openings 185 equally spaced circumferentially of the shelf periphery and each of which may be square in shape, have a length and width each of approximately one tenth of the diameter of chamber 122, and be positioned approximately midway of a radius of chamber 122.

Figure 7:
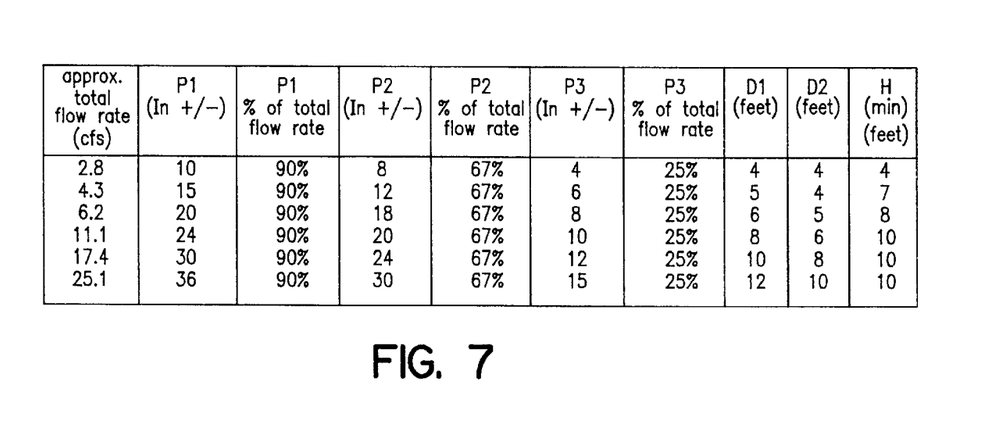
FIG. 7 is a chart of flow rates and various sizes, referenced in FIGS. 1 to 6, for various exemplary models of either embodiment of the apparatus.

FIG. 7 shows some exemplary dimensions for different total flow rates of capacity from about 3 to 25 cubic feet per second. P1 refers to either of conduits 44 and 144, P2 refers to either of conduits 54 and 154, and P3 refers to conduit 76 in either of apparatus 10 and apparatus 100. The table in FIG. 7 also indicates the diameter of the two chambers in feet, D1 being the first chamber and D2 being the second chamber. The height H of the chambers required for the approximate flow values is also listed. For each of these conduits, both a pipe size as a percentage of the total flow rate and a diameter in approximate inches are indicated. Typically, the diameter and slope of existing inlet conduit 18 will be determinative of the total flow rate, or the inlet conduit 18 will be otherwise supplied by the customer in a size for the desired total flow rate based on the conditions in the area. Thus, typically, the conduit 44 or 144 would be sized to have a diameter which is substantially equal to the diameter of inlet conduit 18, i.e., to have a flow rate which is about 90% of the total flow rate for which conduit 18 is sized. These dimensions as well as other dimensions contained herein are for exemplary purposes only and not for purposes of limitation.

Thus, in accordance with the present invention, the outlet from the primary chamber is provided at the location of the vortex in order to receive water with a maximum of non-floatable particles removed therefrom so that the contaminant removal efficiency may be maximized, to achieve a removal rate efficiency of perhaps about 80 percent for a typical bimonthly rainfall activity.

It should be understood that, while the present invention has been described in detail herein, the invention can be embodied otherwise without departing from the principles thereof, and such other embodiments are meant to come within the scope of the present invention as defined in the following claim(s)

What is claimed is an apparatus having one or more of the novel features disclosed herein.

What is claimed is:

1. In an apparatus for separating floating and non-floating particulates from drain water wherein said apparatus includes a first chamber for collecting non-floating particles, a second chamber for collecting floating particles, and a third chamber through which treated drain water can be discharged from the apparatus, the improvement wherein an inlet pipe for introducing drain water into the first chamber is tangential to the first chamber to provide a vortex flow of drain water into said first chamber, and an outlet pipe providing flow of drain water from the first chamber to the second chamber has an inlet at the vortex of drain water flow in the first chamber, wherein an outlet from said first chamber to said second chamber is positioned near the bottom of said second chamber and a flow deflection means is positioned adjacent the outlet from said outlet pipe to deflect floating pollutants in the drain water flowing into said second chamber in an upwardly direction whereby to segregate same during peak storm flows.

2. The apparatus of claim 1 wherein an additional pipe is provided near the top of the first chamber to allow a portion of the drain water during peak storm flows to bypass the second chamber and pass directly from the first chamber to the third chamber.

3. The apparatus of claim 1 wherein anti-vortex cross is provided in the inlet opening of said outlet pipe to provide quiescent flow into the second chamber.

4. The apparatus of claim 3 wherein said anti-vortex cross is for controlling the velocity of swirl or cyclonic effect of the drain water entering the intake whereby to negate the tendency for trapped non-floating particulate from being drawn into said inlet opening during peak storm flows.

5. The apparatus of claim 1 wherein an additional outlet pipe is positioned with a centerline elevation at about the level of introduction of drain water into the first chamber so as to allow minor storm event flows to pass from said first chamber to said second chamber with a minimum of turbulence.

6. The apparatus of claim 2 wherein said additional pipe allows approximately two-thirds of the drain water during peak storm flows to bypass the second chamber and pass directly from the first chamber to the third chamber.

* * * * *